US010836304B2

(12) United States Patent
Taberner (10) Patent No.: US 10,836,304 B2
(45) Date of Patent: Nov. 17, 2020

(54) SECURITY MOUNTING ARRANGEMENT (71) Applicant: Ian Taberner, Springbook (CA)

(72) Inventor: Ian Taberner, Springbook (CA)

( * ) Notice: Subject to any disclaimer, the term of this patent is extended or adjusted under 35 U.S.C. 154(b) by 1039 days.

(21) Appl. No.: 14/948,181

(22) Filed: Nov. 20, 2015

(65) Prior Publication Data

US 2017/0144590 A1  May 25, 2017

(51) Int. Cl.
*B60Q 1/24* (2006.01)
*F16B 41/00* (2006.01)
*B60Q 1/04* (2006.01)
*F21V 17/02* (2006.01)
*E05B 73/00* (2006.01)
*B60R 11/00* (2006.01)

(52) U.S. Cl.
CPC ............ *B60Q 1/24* (2013.01); *B60Q 1/0483* (2013.01); *F16B 41/005* (2013.01); *F21V 17/02* (2013.01); *B60R 2011/0096* (2013.01); *E05B 73/00* (2013.01); *E05B 73/0082* (2013.01)

(58) Field of Classification Search
CPC ............ B60R 25/00; B60R 2011/0096; B60R 11/0205; E05B 73/0082; E05B 67/383; E05B 73/00; E05B 73/0005; E05B 67/36; F16B 41/005; F16B 37/00; F21V 17/02; B60Q 1/0483
USPC ............ 248/551, 553; 411/910; 70/58, 232, 70/DIG. 57, 14, 164
See application file for complete search history.

(56) References Cited

U.S. PATENT DOCUMENTS

| | | | | | |
|---|---|---|---|---|---|
| 1,434,492 | A | * | 11/1922 | Johnson | B62D 43/007 70/260 |
| 1,715,975 | A | * | 6/1929 | Angell | F16B 5/01 411/166 |
| 2,043,872 | A | * | 6/1936 | Wise | F16B 41/005 70/232 |
| 2,069,500 | A | | 2/1937 | McGarry | |
| 2,660,872 | A | * | 12/1953 | Beach | E05B 67/36 70/32 |
| 3,410,122 | A | | 11/1968 | Moses | |

(Continued)

FOREIGN PATENT DOCUMENTS

| CA | 2436350 A1 | 1/2005 |
|---|---|---|
| CN | 2063909 U | 3/1990 |

(Continued)

*Primary Examiner* — Hiwot E Tefera
*Assistant Examiner* — Taylor L Morris
(74) *Attorney, Agent, or Firm* — Black, McCuskey, Souers & Arbaugh LPA (57) ABSTRACT

A security mounting arrangement can include a mounting bracket and a shielding bracket. The mounting bracket can have a first aperture and a second aperture. The shielding bracket can be selectively engageable with the mounting bracket and have a third aperture aligned with the first aperture when the mounting bracket and the shielding bracket are engaged with one another. A passageway extending along an axis can be defined by the first aperture and the third aperture. The passageway can have a first portion with a first diameter, a second portion with a second diameter, and a third portion with a third diameter positioned between the first portion and the second portion along the axis. The third diameter can be greater than the first diameter and the second diameter.

16 Claims, 9 Drawing Sheets

(56) References Cited

U.S. PATENT DOCUMENTS

| | | | | |
|---|---|---|---|---|
| 3,564,879 A * | 2/1971 | Bennett | B41J 29/04 | 70/232 |
| 3,595,041 A * | 7/1971 | Leeper | F16B 41/005 | 248/552 |
| 3,605,460 A * | 9/1971 | Singer et al. | F16B 41/005 | 70/232 |
| 3,672,190 A * | 6/1972 | Palazzolo | E05B 73/0082 | 70/58 |
| 3,673,828 A * | 7/1972 | Jones | B60R 11/0205 | 70/58 |
| 3,744,282 A * | 7/1973 | Hemphill | E05B 73/0082 | 70/232 |
| 3,766,759 A * | 10/1973 | Artner | B60R 11/0205 | 248/318 |
| 3,782,146 A * | 1/1974 | Franke | E05B 73/00 | 70/232 |
| 3,817,065 A * | 6/1974 | Sander | F16B 41/005 | 70/232 |
| 3,822,049 A | 7/1974 | Saunders | | |
| 3,945,227 A * | 3/1976 | Reiland | B60R 11/02 | 70/58 |
| 3,965,705 A * | 6/1976 | Nadler | B60R 11/02 | 70/58 |
| 3,975,935 A * | 8/1976 | Masterson | E05B 77/34 | 70/232 |
| 3,990,276 A * | 11/1976 | Shontz | E05B 73/0005 | 70/58 |
| 4,007,613 A * | 2/1977 | Gassaway | E05B 73/0082 | 70/461 |
| 4,024,737 A | 5/1977 | McInturff | | |
| 4,028,913 A * | 6/1977 | Falk | B60R 11/0205 | 248/553 |
| 4,029,370 A * | 6/1977 | Ziegel | A45C 13/18 | 312/284 |
| 4,038,843 A * | 8/1977 | Daley, Jr. | B60R 11/0205 | 248/552 |
| 4,047,686 A * | 9/1977 | Porter | B60R 11/0205 | 224/483 |
| 4,079,604 A * | 3/1978 | Anderegg | B60R 11/0205 | 248/285.1 |
| 4,081,979 A * | 4/1978 | Dawson | B60R 11/02 | 248/551 |
| 4,103,982 A | 8/1978 | Rudd | | |
| 4,113,291 A * | 9/1978 | Cameron | E05B 67/383 | 174/50 |
| 4,114,001 A * | 9/1978 | Corfield | F16P 3/08 | 200/336 |
| 4,117,700 A | 10/1978 | Saunders | | |
| 4,208,702 A * | 6/1980 | Wotowiec | F21V 17/02 | 248/205.1 |
| 4,232,359 A * | 11/1980 | Leon | F21V 14/02 | 362/268 |
| 4,261,666 A * | 4/1981 | Katayama | B25B 9/02 | 24/279 |
| 4,353,521 A * | 10/1982 | Webb | E05B 73/00 | 248/551 |
| 4,357,814 A * | 11/1982 | Kripner | F16K 35/10 | 137/382 |
| 4,406,140 A * | 9/1983 | Wolter | F16B 41/005 | 70/231 |
| 4,414,829 A * | 11/1983 | Nielsen, Jr. | E05B 65/0089 | 292/251 |
| 4,495,787 A | 1/1985 | Comstock | | |
| 4,579,311 A * | 4/1986 | Spranza, III | A47B 21/04 | 108/94 |
| 4,582,290 A | 4/1986 | Baron | | |
| 4,584,856 A * | 4/1986 | Petersdorff | E05B 17/142 | 379/445 |
| 4,585,202 A * | 4/1986 | Parsekian | G08B 13/1409 | 248/500 |
| 4,619,122 A * | 10/1986 | Simpson | E05B 67/36 | 411/329 |
| 4,626,009 A * | 12/1986 | Burnett | F16B 37/0842 | 292/327 |
| 4,645,397 A * | 2/1987 | Howe | F16B 41/005 | 411/372.6 |
| 4,656,848 A * | 4/1987 | Rose | E05B 73/0082 | 70/232 |
| 4,696,449 A * | 9/1987 | Woo | E05B 73/0082 | 211/8 |
| 4,712,763 A * | 12/1987 | Leite | E05B 73/0082 | 248/553 |
| 4,714,303 A * | 12/1987 | Suzuki | B60R 11/0241 | 248/251 |
| 4,791,535 A | 12/1988 | Sclafani et al. | | |
| 4,856,305 A * | 8/1989 | Adams | E05B 73/0005 | 70/58 |
| 4,898,009 A * | 2/1990 | Lakoski | E05B 73/00 | 439/133 |
| 4,934,649 A * | 6/1990 | Stout | E05B 73/0005 | 248/551 |
| 4,942,745 A * | 7/1990 | Jacobs | E05B 73/0082 | 70/258 |
| 5,027,627 A * | 7/1991 | Derman | A47B 97/00 | 70/164 |
| 5,052,199 A * | 10/1991 | Derman | E05B 73/0082 | 70/19 |
| 5,063,763 A * | 11/1991 | Johnson | E05B 73/00 | 70/34 |
| 5,064,326 A * | 11/1991 | Davis | F16B 41/005 | 292/327 |
| 5,076,079 A * | 12/1991 | Monoson | E05B 73/0005 | 248/553 |
| 5,082,233 A * | 1/1992 | Ayers | E05B 73/0082 | 248/205.3 |
| 5,085,395 A * | 2/1992 | Frater | E05B 73/0082 | 248/205.3 |
| 5,097,686 A * | 3/1992 | Plumer | E05B 35/008 | 70/232 |
| 5,214,945 A * | 6/1993 | Martin | B62D 53/085 | 70/167 |
| 5,305,621 A * | 4/1994 | Broadwater | G11B 33/005 | 360/137 |
| 5,314,162 A * | 5/1994 | Kelley | E05B 73/0082 | 248/551 |
| 5,388,434 A * | 2/1995 | Kalis | B60R 11/02 | 248/553 |
| 5,433,094 A * | 7/1995 | Sandin | E05B 73/0076 | 70/232 |
| 5,447,045 A * | 9/1995 | Cheng | E05B 73/0005 | 248/552 |
| 5,601,273 A * | 2/1997 | Avganim | E05B 73/0082 | 248/551 |
| 5,660,451 A * | 8/1997 | Glynn | E05B 73/0082 | 248/551 |
| 5,692,722 A * | 12/1997 | Lundagårds | E05B 73/0082 | 248/224.61 |
| 5,740,685 A * | 4/1998 | Daoud | H01R 13/6397 | 292/307 R |
| 5,823,495 A * | 10/1998 | Joss | B60R 11/0205 | 248/309.1 |
| 5,827,029 A * | 10/1998 | Denman | F16B 41/005 | 411/373 |
| 5,839,303 A * | 11/1998 | Umberg | E05B 73/0082 | 70/58 |
| 5,904,383 A | 5/1999 | Van Der Wal | | |
| 5,988,966 A | 11/1999 | Chen et al. | | |
| 6,039,140 A * | 3/2000 | Painter | B60R 21/20 | 180/287 |
| 6,109,077 A * | 8/2000 | Lee | E05B 73/0005 | 70/232 |
| 6,138,483 A * | 10/2000 | Galant | E05B 73/0082 | 248/551 |
| 6,139,075 A * | 10/2000 | Daoud | E05B 67/383 | 292/149 |
| 6,212,921 B1 * | 4/2001 | Knighton | E05B 73/0082 | 248/551 |

(56) References Cited

U.S. PATENT DOCUMENTS

| | | | |
|---|---|---|---|
| 6,216,499 B1* | 4/2001 | Ronberg | E05B 73/0082 248/551 |
| 6,257,542 B1* | 7/2001 | Westfield | E05B 73/0082 248/551 |
| 6,494,658 B1* | 12/2002 | Roy | F16B 33/008 411/372.5 |
| 6,522,368 B1* | 2/2003 | Tuccinardi | B60R 11/02 248/923 |
| 6,726,515 B1* | 4/2004 | DeMange | F16B 41/005 440/113 |
| 7,172,381 B2* | 2/2007 | Miyazaki | F16B 37/14 411/372.6 |
| 7,219,582 B2* | 5/2007 | Ito | B25B 13/485 81/121.1 |
| 7,243,514 B2* | 7/2007 | Frantz | B60R 11/0235 248/553 |
| 7,324,333 B2* | 1/2008 | Allen | E05B 73/0082 211/8 |
| 7,392,674 B1* | 7/2008 | Grote | F16B 37/14 411/910 |
| 7,562,547 B2* | 7/2009 | Avganim | E05B 73/0082 70/14 |
| 7,614,264 B2* | 11/2009 | McGettrick | E05B 9/08 248/553 |
| 7,971,458 B2* | 7/2011 | Gilbert | E05B 73/0082 248/552 |
| 8,051,690 B2* | 11/2011 | Camisasca | F16B 41/00 411/432 |
| 8,297,090 B2* | 10/2012 | Fong | E05B 67/383 248/551 |
| 8,388,256 B2* | 3/2013 | Atkins | E21B 37/02 403/195 |
| 8,590,714 B1* | 11/2013 | Osuna-Valerio | E05B 73/00 109/50 |
| 8,739,585 B2* | 6/2014 | Sims | B60B 3/165 301/37.21 |
| 2002/0162932 A1 | 11/2002 | Poorman | |
| 2005/0002756 A1 | 1/2005 | Oleszek | |
| 2005/0008451 A1* | 1/2005 | Groppo | F16B 39/08 411/431 |
| 2008/0145139 A1* | 6/2008 | Atkins | F16B 37/00 403/7 |
| 2008/0264118 A1* | 10/2008 | King | E05B 67/36 70/58 |
| 2010/0186465 A1* | 7/2010 | Frantz | B60R 11/02 70/58 |
| 2013/0136557 A1* | 5/2013 | Wang | F16B 31/021 411/1 |
| 2014/0271027 A1* | 9/2014 | Daniels | F16B 2/16 411/166 |
| 2014/0346299 A1 | 11/2014 | Sterling | |
| 2016/0032959 A1* | 2/2016 | Cadena | F16B 39/28 411/110 |
| 2016/0194906 A1* | 7/2016 | Hentschel | E05B 73/00 70/58 |

FOREIGN PATENT DOCUMENTS

| | | |
|---|---|---|
| CN | 2179486 Y | 11/1993 |
| CN | 200978872 Y | 11/2007 |
| CN | 201344196 Y | 11/2009 |
| CN | 201763780 U | 3/2011 |
| CN | 102312901 A | 1/2012 |
| CN | 203713753 U | 7/2014 |
| EP | 0231218 A1 | 1/1987 |
| EP | 0519126 A1 | 12/1992 |
| JP | 2003343537 A | 12/2003 |
| JP | 2014015990 A | 1/2014 |
| JP | 2014159863 A | 9/2014 |

* cited by examiner

SECURITY MOUNTING ARRANGEMENT

BACKGROUND

1. Field

The present disclosure relates to mounting arrangement for mounting an accessory structure to a primary structure that inhibits theft of the accessory structure.

2. Description of Related Prior Art

U.S. Pat. No. 4,791,535 discloses a Security device for fog lights. A fog light security apparatus (10) is adapted to secure a plurality of fog lights (50) wherein the security apparatus (10) comprises: a base unit (11); a cover unit (12); and a securing unit (13), wherein the securing unit (13) comprises a plurality of securing members (22) adapted to secure the cover unit (12) to the base unit (11); and, wherein the securing members (22) comprise threaded bolt elements (23) having an enlarged head (24) with a specially contoured recess (25) that will only accept a complimentary configured tool (80).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A security mounting arrangement can include a mounting bracket and a shielding bracket. The mounting bracket can have a first aperture and a second aperture spaced from one another. The first aperture can be configured to receive a fastener for interconnecting the mounting bracket to an accessory structure. The second aperture can be configured to receive another fastener for interconnecting the mounting bracket to a primary structure. The shielding bracket can be selectively engageable with the mounting bracket and have a third aperture aligned with the first aperture when the mounting bracket and the shielding bracket are engaged with one another. A passageway extending along an axis can be defined by the first aperture and the third aperture. The passageway can extend through the mounting bracket and the shielding bracket when the mounting bracket and the shielding bracket are engaged with one another. The passageway can extend between a first end defined by the mounting bracket and a second end defined by the shielding bracket. The passageway can have a first portion with a first diameter positioned proximate to the first end of the passageway, a second portion with a second diameter positioned proximate to the second end of the passageway, and a third portion with a third diameter positioned between the first portion and the second portion along the axis. The third diameter can be greater than the first diameter and the second diameter.

BRIEF DESCRIPTION OF THE DRAWINGS

The detailed description set forth below references the following drawings.

DETAILED DESCRIPTION

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Similar features in a particular embodiment have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide a security mounting arrangement to prevent the theft of accessory structures from primary structures. By way of example and not limitation, a primary structure can be a vehicle. By way of example and not limitation, an accessory structure can be a light bar, a speaker, or any other hard-mounted items on vehicles or other related items.

A security mounting arrangement 10 can include a mounting bracket 12 and a shielding bracket 14. The mounting bracket 12 can have a first aperture 16 and a second aperture 18 spaced from one another. The first aperture 16 can be configured to receive a fastener for interconnecting the mounting bracket 12 to an accessory structure. In the first exemplary embodiment of the present disclosure, the accessory structure can be a light bar 20. The second aperture 18 can be configured to receive another fastener for interconnecting the mounting bracket 12 to a primary structure. In the first exemplary embodiment of the present disclosure, the primary structure can be a vehicle (referenced at 22 in FIG. 3). In the first exemplary embodiment of the present disclosure, the security mounting arrangement 10 and a second security mounting arrangement 110 are utilized to securely mount the light bar 20 to the vehicle 22. The exemplary arrangements 10, 110 are substantially identical.

The shielding bracket 14 can be selectively engageable with the mounting bracket 12 and have a third aperture 24 aligned with the first aperture 16 when the mounting bracket 12 and the shielding bracket 14 are engaged with one another. The security mounting arrangement can also include at least one tongue and groove arrangement operably disposed between the mounting bracket 12 and the shielding bracket 14. The mounting bracket 12 and the shielding bracket 14 can be interconnected to one another through the at least one tongue and groove arrangement. In the at least one tongue and groove arrangement, one of the mounting bracket 12 and the shielding bracket 14 includes one of a tongue and a groove and the other of the mounting bracket 12 and the shielding bracket 14 includes the other of the tongue and the groove, the mounting bracket 12 and the shielding bracket 14 further defined as engaged with one another by sliding the tongue into the groove.

Figure 2:
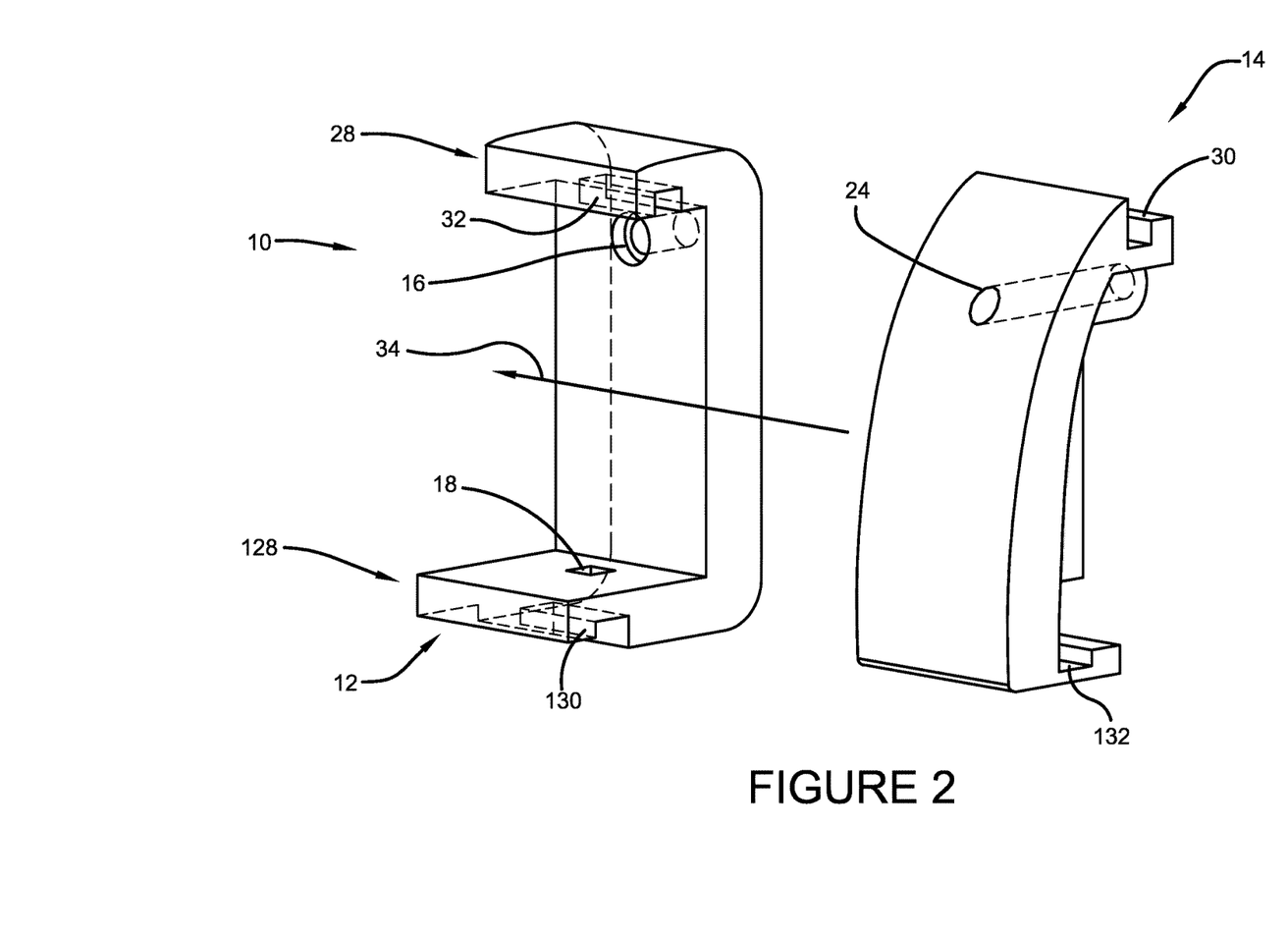
FIG. 2 is a perspective, partially exploded view of an exemplary security mounting arrangement.
Figure 3:
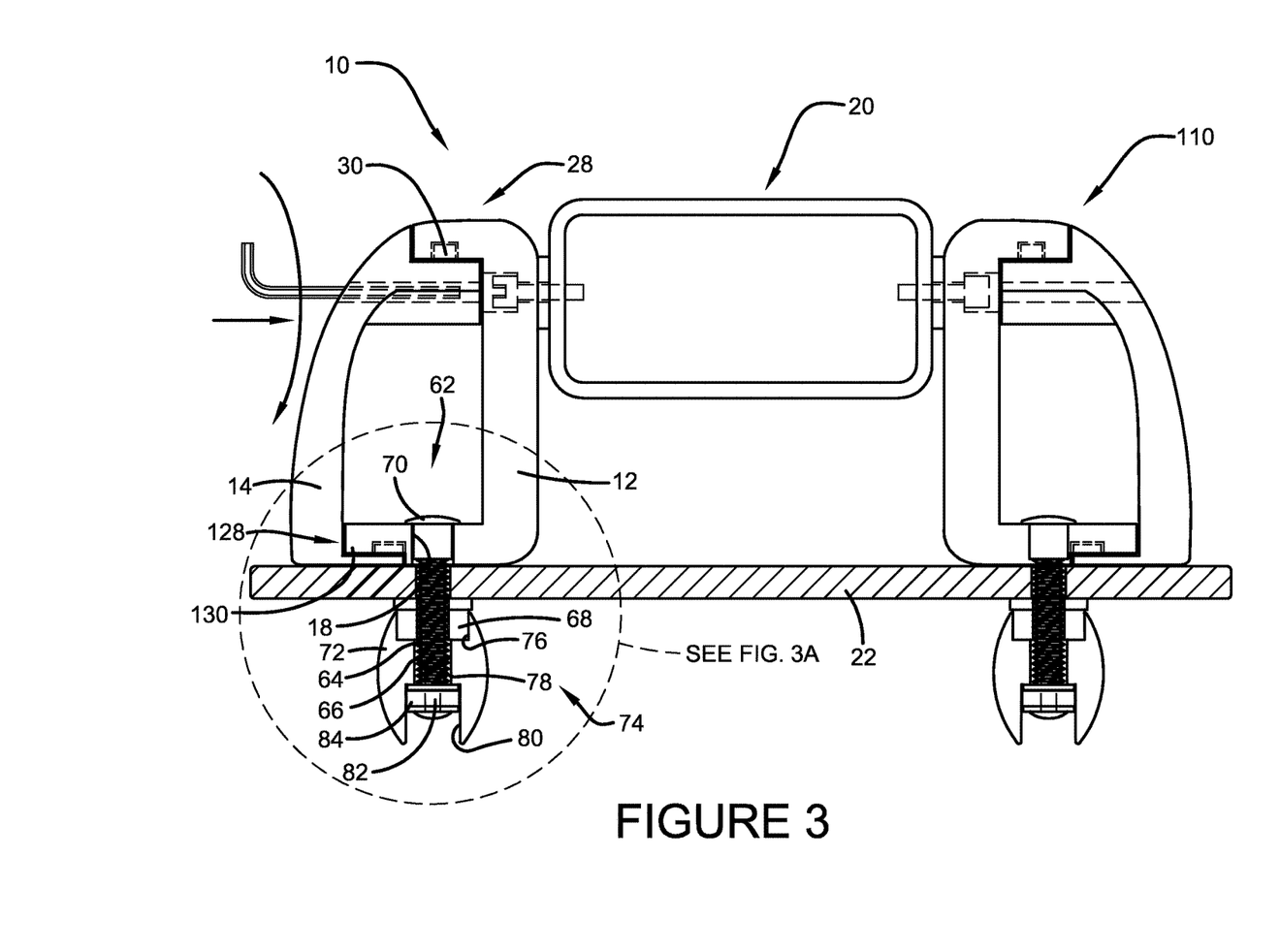
FIG. 3 is a rear view of the vehicle lighting assembly shown in FIG. 1 mounted on a primary structure such as a vehicle.
Figure 3A:
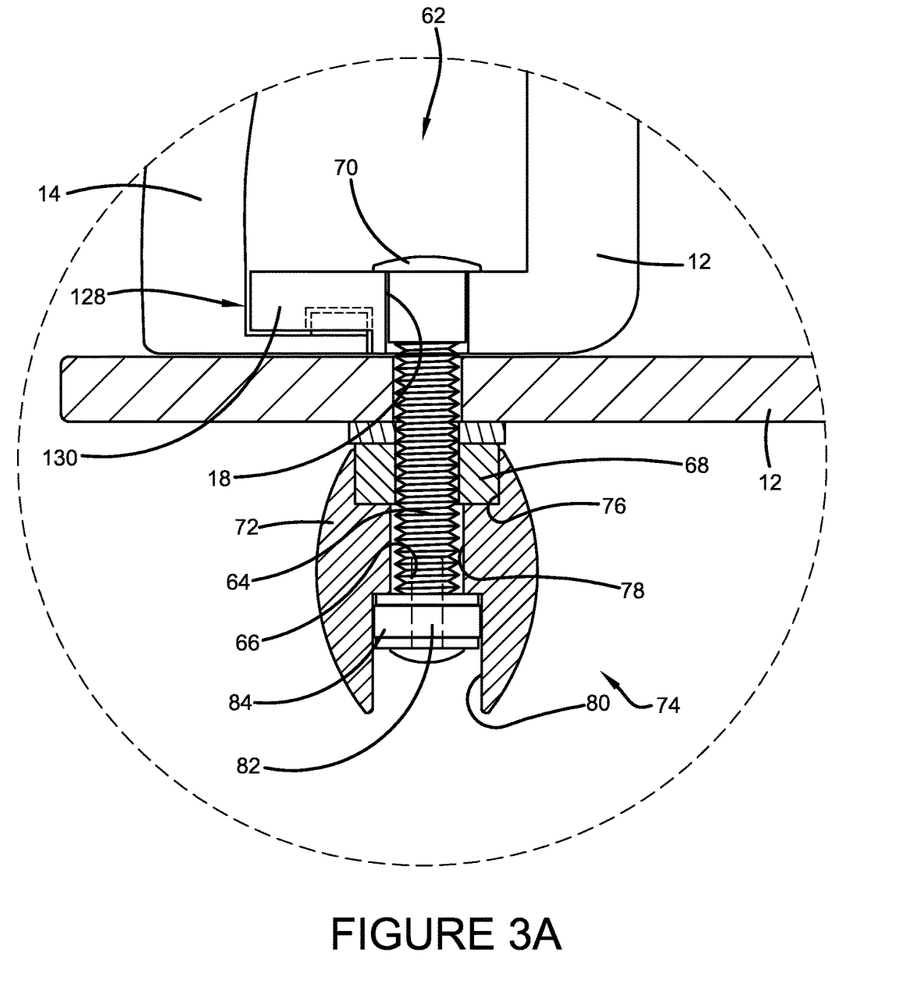
FIG. 3A is an enlarged portion of FIG. 3.

In the first exemplary embodiment of the present disclosure, the at least one tongue and groove arrangement is further defined as a plurality of tongue and groove arrangements 28 and 128. As best shown in FIG. 3, the first tongue and groove arrangement 28 can be positioned proximate to the first aperture 16 and the second tongue and groove arrangement 128 positioned proximate to the second aperture 18. In the exemplary tongue and groove arrangement 28, the mounting bracket 12 includes a groove 32 (referenced in FIG. 2) and the shielding bracket 14 includes a tongue 30. In the exemplary tongue and groove arrangement 128, the mounting bracket 12 includes a groove 130 and the shielding bracket 14 includes a tongue 132. The mounting bracket 12 and the shielding bracket 14 can be engaged with one another by sliding the tongue 30 into the groove 32 and the tongue 132 into the groove 130. The direction of sliding movement is referenced by arrow 34.

Figure 1:
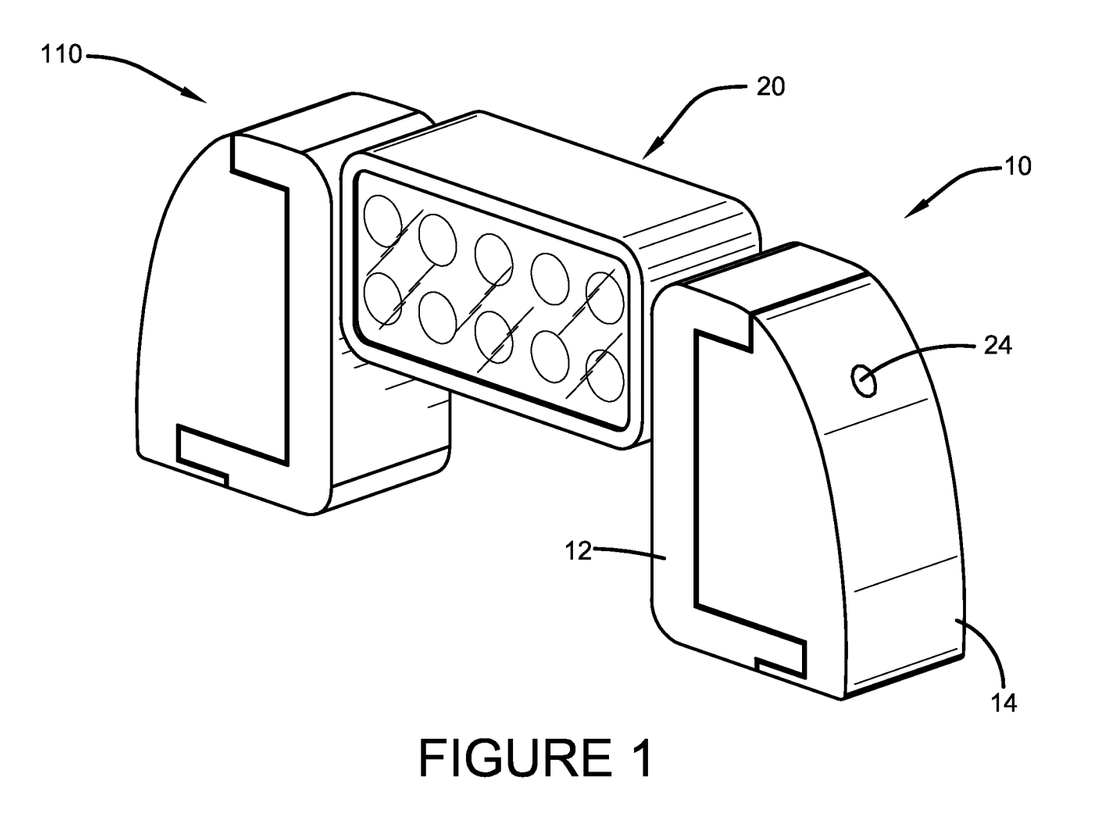
FIG. 1 is a perspective view of a vehicle lighting assembly incorporating an exemplary embodiment of the present disclosure.
Figure 4:
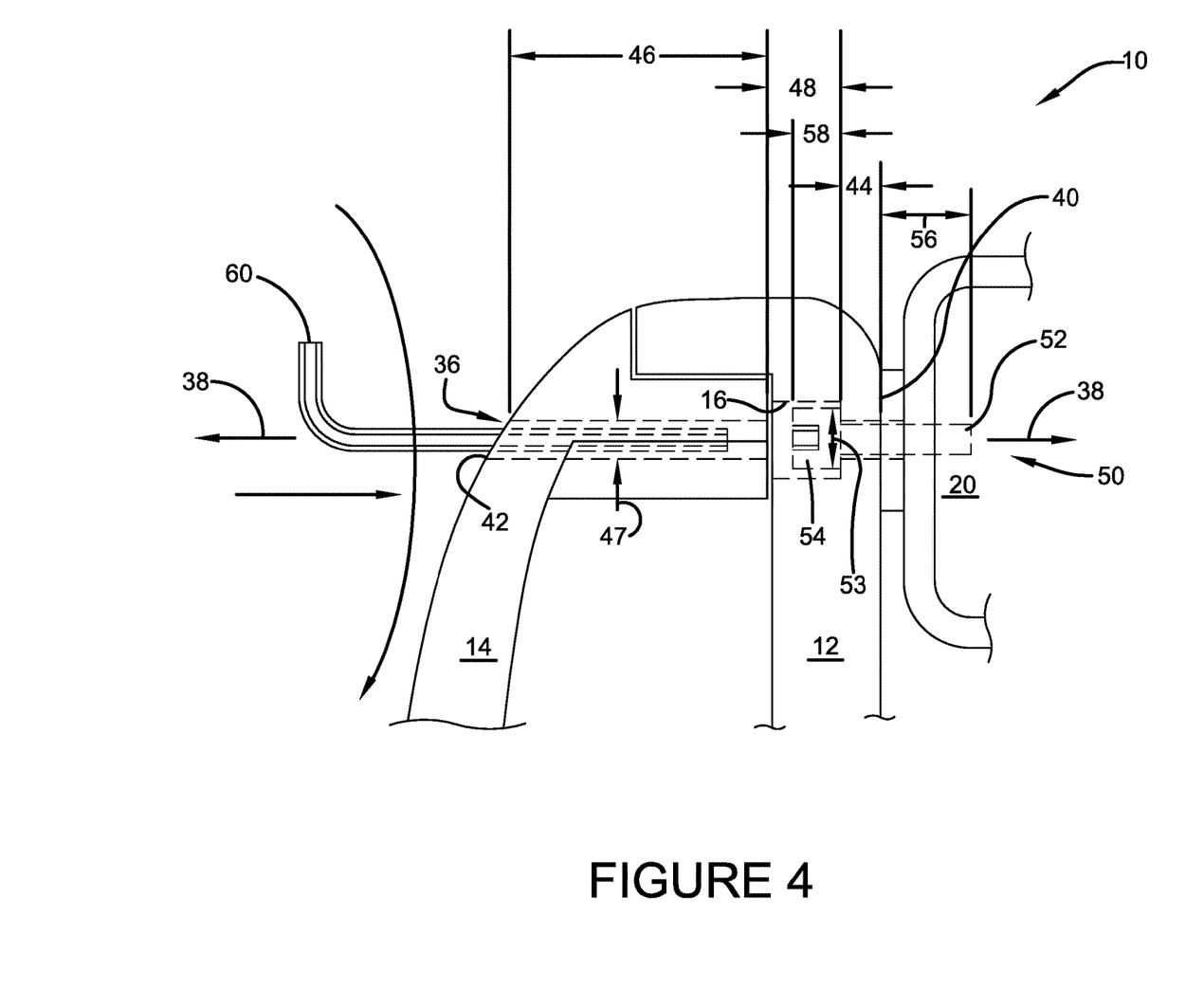
FIG. 4 is an enlarged portion of FIG. 3.

As best shown in FIG. 4, a passageway 36 extending along an axis 38 can be defined by the first aperture 16 and the third aperture 24 (referenced in FIG. 1). The first tongue and groove arrangement 28 and the second tongue and groove arrangement 128 can be positioned on opposite sides of the axis 38. The passageway 36 can extend through the mounting bracket 12 and the shielding bracket 14 when the mounting bracket 12 and the shielding bracket 14 are engaged with one another. The passageway 36 can extend between a first end 40 defined by the mounting bracket 12 and a second end 42 defined by the shielding bracket 14.

The passageway 36 can have a first portion 44 with a first diameter positioned proximate to the first end 40 of the passageway 36. The exemplary first portion 44 can be defined fully by the mounting bracket 12. The passageway 36 can also have a second portion 46 with a second diameter positioned proximate to the second end 42 of the passageway 36. The exemplary second portion 46 can be defined fully by the shielding bracket 14. The passageway 36 can also have a third portion 48 with a third diameter. The third position can be positioned between the first portion 44 and the second portion 46 along the axis 38. The third diameter can be greater than the first diameter and the second diameter. The exemplary third portion 48 can be defined fully by the mounting bracket 12.

The mounting bracket 12 and the shielding bracket 14 can abut one another when engaged with one another and close the passageway 36 between the first end 40 and the second end 42. The passageway 36 can define a through-hole between the first end 40 and the second end 42 when the mounting bracket 12 and the shielding bracket 14 are engaged with one another.

In an exemplary operation, a fastening member 50 can interconnect the mounting bracket 12 to the light bar 20. The fastening member 50 can include a shaft 52 with outwardly-facing threads. The shaft 50 can be extendable through the first aperture 16. The first portion 44 and the third portion 48 of the passageway 36 are defined by the first aperture. The fastening member 50 can also include a head 54 engaged with the shaft 52. The head 54 can have a larger diameter than the shaft 52 and a larger diameter than the first diameter of the first portion 44. As shown in FIG. 4, the head 54 can define a width 53 and the width 53 is larger than a diameter 47 of the second portion 46. The head 54 can be positioned in the third portion 48. The shaft 52 can protrude out of the first aperture 16 a first length 56. The head 54 can defines a height 58. The third portion 48 can extend along the axis 38 a second length (referenced also as 48). The first length 56 combined with the height 58 can be greater than the second length 48.

As a result, the fastening member 50 can be backed out of the first portion 44 of the passageway 36 to allow the light bar 20 to be rotatably adjusted relative to the security mounting arrangement 10. A tool 60 can be inserted through the second portion 46 to engage the fastening member 50 for loosening the fastening member 50 and thereby allowing the light bar 20 to be rotatably adjusted relative to the security mounting arrangement 10. However, first length 56 combined with the height 58 can be greater than the second length 48 so that the fastening member 50 cannot be fully disengaged from the light bar 20. Thus, the light bar 20 cannot be fully disengaged from the security mounting arrangement 10. The fastening member 50 can be loosened (backed out of the first portion 44) until the head 54 abuts the shoulder defined between the second portion 46 and the third portion 48.

The mounting bracket 12 and the shielding bracket 14 can be formed from hardened steel to enhance the strength of the security mounting arrangement 10 and inhibit unpermitted removal of the light bar 20.

The light bar 20 and security mounting arrangement 10 can be mounted to the primary structure 22 with a fastening member 62. The fastening member 62 can be a bolt extendable through the second aperture 18. The fastening member 62 can have a shaft 64 with outwardly-facing threads and a fifth aperture 66 having inwardly-facing threads. Another fastening member 68 can be a nut threadingly engageable with the outwardly-facing threads of the fastening member 62. The primary structure 22 and the mounting bracket 12 can be pressed between the fastening member 68 and a head 70 of the fastening member 62 when the light bar 20 and security mounting arrangement 10 are mounted to the primary structure 22.

A sleeve 72 can have a sixth aperture 74 configured to receive the fastening member 68 and can have an outer arcuate surface. The outer surface can have a truncated egg shape or a truncated sphere. The sixth aperture 74 can have a first portion 76 with a first diameter positioned proximate to the fastening member 68, a second portion 78 with a second diameter less than the first diameter and positioned proximate to the first portion 76, and a third portion 80 with a third diameter greater than the second diameter and positioned adjacent the second portion 76.

A fastening member 82 can be a bolt extendable through the sixth aperture 74 and threadingly engageable with the inwardly-facing threads of the shaft 64. The fastening member 82 can have a head with a diameter greater than the second diameter of the sixth aperture 74 and less than a third diameter of the sixth aperture 74. The fastening member 82 can thus be threadingly engaged with the shaft 64 to fix the sleeve 72 in place over the fastening member 68. The fastening member 68 can define a height and is fully encircled by the sleeve 72 along the height. The sleeve 72 can thereby prevent the fastening member 68 from being turned or otherwise manipulated with a tool. A fastening member 84 in the form of a nut can be disposed between the head of the fastening member 82 and the second portion 78 to expand the cross-sectional area of contact between the fastening member 62 and the sleeve 72, enhancing the strength of the joint.

Figure 5:
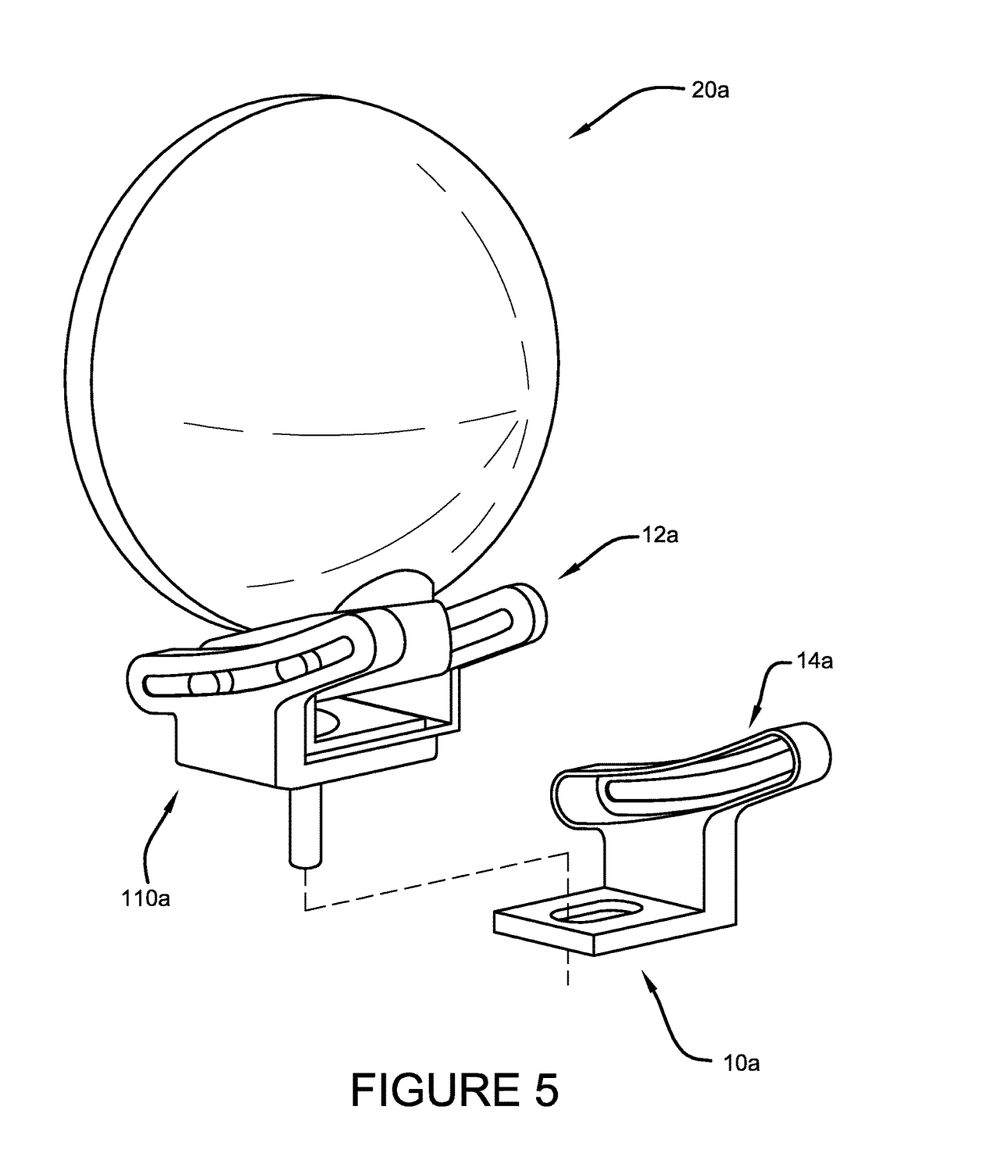
FIG. 5 is a perspective, partially exploded view of another vehicle lighting assembly incorporating an exemplary embodiment of the present disclosure.
Figure 6:
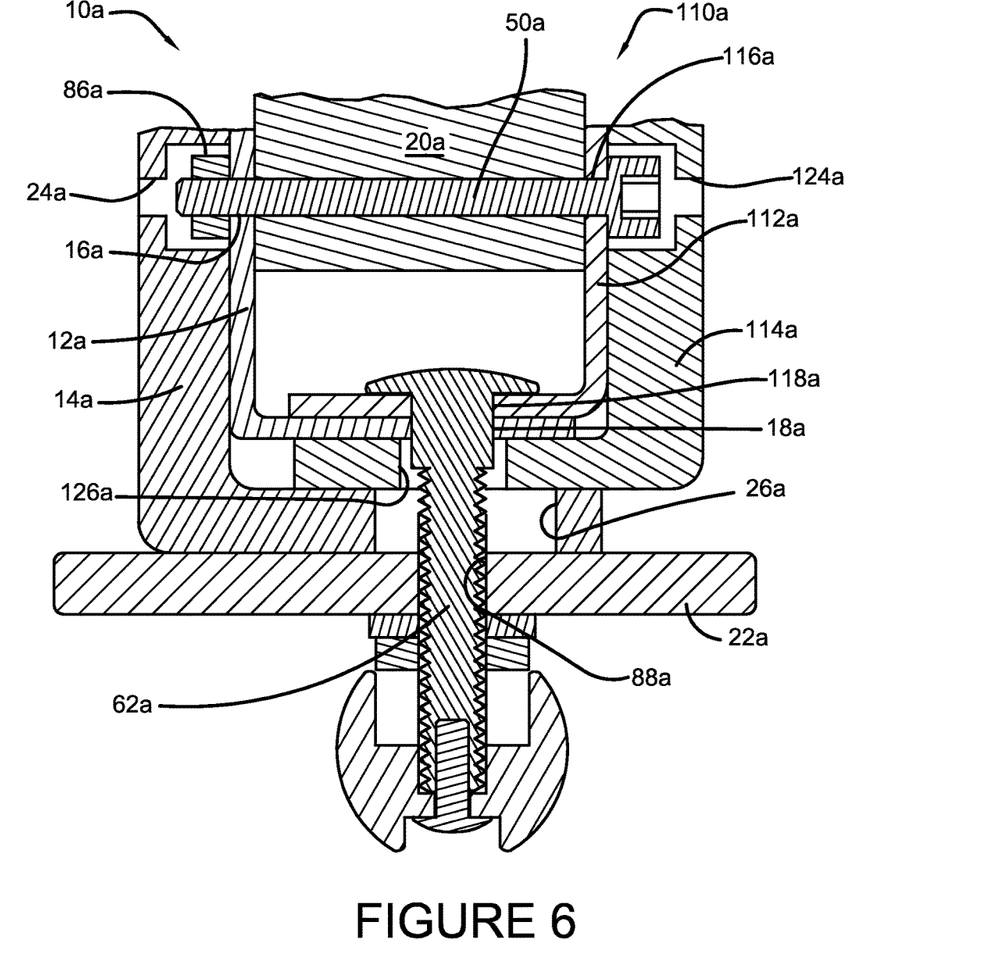
FIG. 6 is a cross-section through the vehicle lighting assembly shown in FIG. 5.

In another embodiment of the present disclosure, illustrated in FIGS. 5 and 6, a security mounting arrangement 10a can include a mounting bracket 12a and a shielding bracket 14a. The mounting bracket 12a can have a first aperture 16a and a second aperture 18a spaced from one another. The first aperture 16a can be configured to receive a fastener 50a for interconnecting the mounting bracket 12a to an accessory structure. In the first exemplary embodiment of the present disclosure, the accessory structure can be a spotlight 20a. The second aperture 18a can be configured to receive another fastener 62a for interconnecting the mounting bracket 12a to a primary structure. In the second exemplary embodiment of the present disclosure, the security mounting arrangement 10a and a second security mounting arrangement 110a are utilized to securely mount the spotlight 20a to a vehicle 22a. The exemplary arrangements 10a, 110a are substantially identical. The shielding bracket 14a can be selectively engageable with the mounting bracket 12a and have a third aperture 24a aligned with the first aperture 16a when the mounting bracket 12a and the shielding bracket 14a are engaged with one another. The shielding bracket 14a can also include a fourth aperture 26a aligned with the second aperture 18a when the mounting bracket 12a and the shielding bracket 14a are engaged with one another.

In an exemplary operation, the fastening member 50a can be directed through a first aperture 116a of a mounting bracket 112a. A shielding bracket 114a can be placed over the mounting bracket 112a such that an aperture 124a of the shielding bracket 114a is aligned with the first aperture 116a and that an aperture 126a of the shielding bracket 114a is aligned with a second aperture 118a of the mounting bracket 112a. The fastening member 62a can then be directed through the apertures 118a and 126a. The fastening member 50a can then be directed through an aperture in the spotlight 20a.

Another mounting bracket 12a can be then be assembled to the other structures by directing the fastening member 50a through a first aperture 16a of the mounting bracket 12a. A second aperture 18a can be slot and be directed to receive the fastening member 62a.

A fastening member 86a can then be threadingly engaged with the fastening member 50a and tightened to secure the spotlight 20a to the mounting brackets 12a, 112a. A shielding bracket 14a can be placed over the mounting bracket 12a such that the aperture 24a of the shielding bracket 14a is aligned with the first aperture 16a and that an aperture 26a of the shielding bracket 14a is aligned with the second aperture 18a. The aperture 26a can be elongated to allow the bracket 14a to assemble to the other structures. At this point of assembly, the fastening member 62a is directed through the apertures 118a, 18a, 126a, 26a. The assembly can then be mounted on a vehicle by directing fastening member 62a through an aperture 88a in the primary structure 22a.

Figure 7:
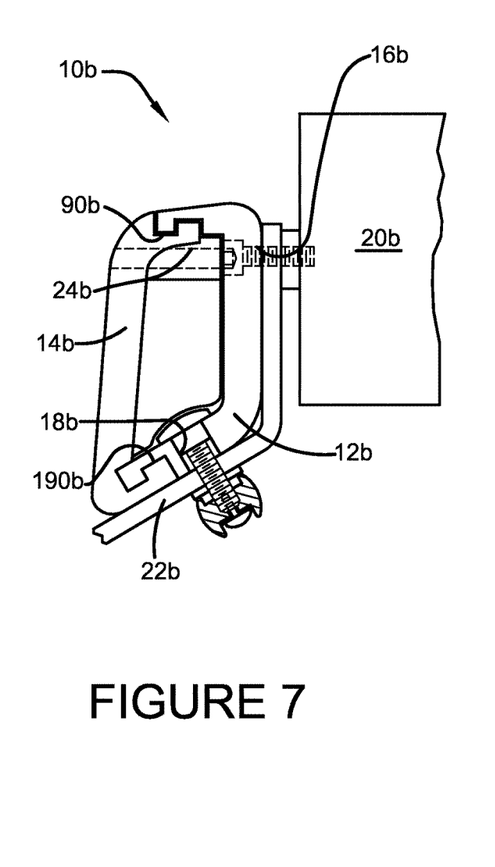
FIG. 7 is a cross-section through another exemplary embodiment of the present disclosure.

In another embodiment of the present disclosure, illustrated in FIG. 7, a security mounting arrangement 10b can include a mounting bracket 12b and a shielding bracket 14b. The mounting bracket 12b can have a first aperture 16b and a second aperture 18b spaced from one another. The first aperture 16b can be configured to receive a fastener for interconnecting the mounting bracket 12b to an accessory structure 20b. The second aperture 18b can be configured to receive another fastener for interconnecting the mounting bracket 12b to a primary structure 22b. The shielding bracket 14b can be selectively engageable with the mounting bracket 12b and have a third aperture 24b aligned with the first aperture 16b when the mounting bracket 12b and the shielding bracket 14b are engaged with one another. In the third embodiment of the present disclosure, a passageway similar to passageway 36 is defined by the apertures 16b and 24b.

In contrast to the first embodiment, a third portion of the passageway in this embodiment (the portion in which the head of the fastening member is positioned) provides less space to back out the fastening member. Another difference is that tongue and groove arrangements of this embodiment include a first tongue and groove arrangement with a first groove having a first bottom surface 90b in a first plane and a second tongue and groove arrangement with a second groove having a second bottom surface 190b in a second plane, wherein the first plane is transverse to the second plane. Also, the first aperture 16b and the second aperture 18b are defined in different, transverse but non-perpendicular planes.

Figure 8:
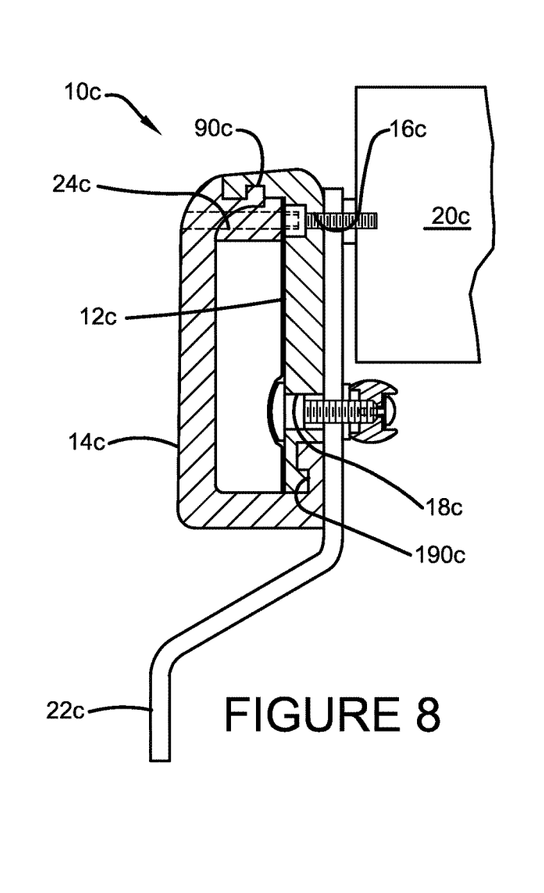
FIG. 8 is a cross-section through another exemplary embodiment of the present disclosure.

In another embodiment of the present disclosure, illustrated in FIG. 8, a security mounting arrangement 10c can include a mounting bracket 12c and a shielding bracket 14c. The mounting bracket 12c can have a first aperture 16c and a second aperture 18c spaced from one another. The first aperture 16c can be configured to receive a fastener for interconnecting the mounting bracket 12c to an accessory structure 20c. The second aperture 18c can be configured to receive another fastener for interconnecting the mounting bracket 12c to a primary structure 22c. The shielding bracket 14c can be selectively engageable with the mounting bracket 12c and have a third aperture 24c aligned with the first aperture 16c when the mounting bracket 12c and the shielding bracket 14c are engaged with one another. In the third embodiment of the present disclosure, a passageway similar to passageway 36 is defined by the apertures 16c and 24c.

In contrast to the first embodiment, a third portion of the passageway in this embodiment (the portion in which the head of the fastening member is positioned) provides less space to back out the fastening member. Another difference is that tongue and groove arrangements of this embodiment include a first tongue and groove arrangement with a first groove having a first bottom surface 90c in a first plane and a second tongue and groove arrangement with a second groove having a second bottom surface 190c in a second plane, wherein the first plane is perpendicular to the second plane. Also, the first aperture 16c and the second aperture 18c are defined in coplanar or parallel planes and not perpendicular planes.

Figure 9:
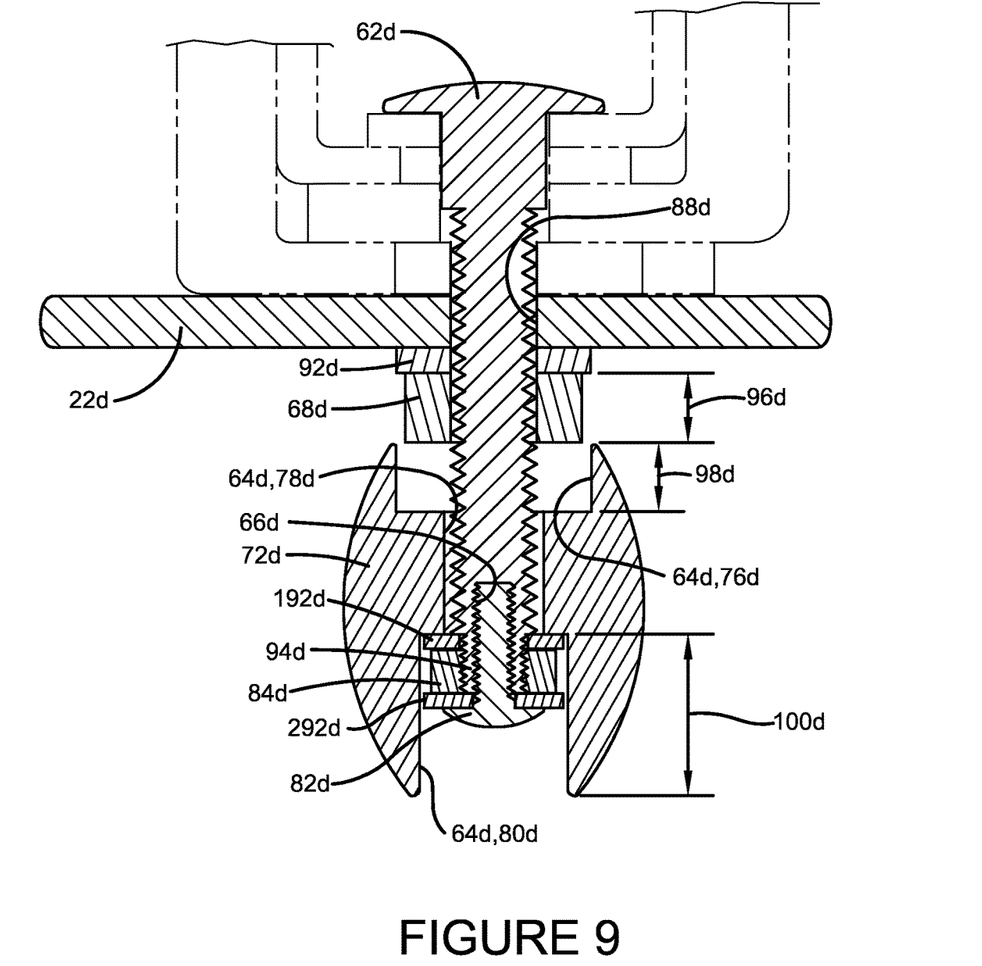
FIG. 9 is a cross-section through another part of the present disclosure.

Another portion of the present disclosure is illustrated in FIG. 9. An accessory (shown in phantom) and security mounting arrangement (shown in phantom) can be mounted to the primary structure 22d with a fastening member 62d. The fastening member 62d can be a bolt extendable through an aperture 88d. The fastening member 62d can have a shaft with outwardly-facing threads and a fifth aperture 66d having inwardly-facing threads. Another fastening member 68d can be a nut threadingly engageable with the outwardly-facing threads of the fastening member 62d. The fastening member 68d has height referenced at 96d. The primary structure 22d and the mounting bracket can be pressed between the fastening member 68d and a head of the fastening member 62d.

A sleeve 72d can have an aperture 74d configured to receive the fastening member 68d and can have an outer arcuate surface. The outer surface can have a truncated egg shape or a truncated sphere. The aperture 74d can have a first portion 76d with a first diameter positioned proximate to the fastening member 68d, a second portion 78d with a second diameter less than the first diameter and positioned proximate to the first portion 76d, and a third portion 80d with a third diameter greater than the second diameter and positioned adjacent the second portion 78d. The first portion 76d has height 98d. The height 98d can be selected so that the fastening member 68d cannot be engaged with a tool when the fastening member 68d is received a maximum amount in the first portion 76d. The third portion 80d has height 100d. The height 98d is less than the height 100d.

A fastening member 82d can be a bolt extendable through the aperture 74d and threadingly engageable with the inwardly-facing threads of the fastening member 62d. The fastening member 82d can have a head with a diameter greater than the second diameter of the aperture 74d and less than the third diameter of the aperture 74d. The fastening member 82d can thus be threadingly engaged with the fastening member 62d to fix the sleeve 72d to the fastening member 62d. A fastening member 84d in the form of a nut can be disposed between the head of the fastening member 82d and the second portion 78d to expand the cross-sectional area of contact between the fastening member 62d and the sleeve 72d, enhancing the strength of the joint. Further, the fastening member 84d can be threadingly engaged with the fastening member 62d, on a smaller-diameter tip portion 94d of the fastening member 62d having outwardly-facing threads. Various locking washers can also be utilized, and are referenced at 92d, 192d, and 292d.

In operation, the fastening member 68d can be exposed to allow loosening so that the orientation of the accessory can be adjusted. The fastening member 68d can only be adjusted until it is received in the first portion 76d. Further loosening is prevented by the sleeve 72d. The sleeve 72d is generally freely moveable along the fastening member 62d, limited by the fastening member 68d and the fastening member 84d. The depth of the third portion 80d can be selected to ensure that the fastening member 82d and 84d are never exposed. The fastening member 82d can be threadingly engaged with the fastening member 62d and can also be permanently fixed to the fastening member 62d, such as by adhesive, to further secure the accessory. Alternatively or in addition, epoxy can fill the indentation in the head of the fastening member 82d so that a tool cannot be inserted therein, further securing the accessory.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A security mounting arrangement comprising:
a mounting bracket having a first aperture and a second aperture spaced from one another, said first aperture configured to receive a fastener for interconnecting said mounting bracket to an accessory structure, said second aperture configured to receive another fastener for interconnecting said mounting bracket to a primary structure;
a shielding bracket selectively engageable with said mounting bracket having a third aperture aligned with said first aperture when said mounting bracket and said shielding bracket are engaged with one another;
wherein a passageway extending along an axis is defined by said first aperture and said third aperture and extends through said mounting bracket and said shielding bracket when said mounting bracket and said shielding bracket are engaged with one another, said passageway extending between a first end defined by said mounting bracket and a second end defined by said shielding bracket, said passageway having a first portion with a first diameter positioned proximate to said first end of said passageway, said passageway having a second portion with a second diameter positioned proximate to said second end of said passageway, said passageway having a third portion with a third diameter positioned between said first portion and said second portion along said axis, and said third diameter being greater than said first diameter and said second diameter; and
at least one tongue and groove arrangement wherein one of said mounting bracket and said shielding bracket further comprises one of a tongue and a groove and the other of said mounting bracket and said shielding bracket further comprises the other of said tongue and said groove, said mounting bracket and said shielding bracket further defined as engaged with one another by sliding said tongue into said groove, and wherein said tongue and said groove slide relative to one another during engagement along an axis that is transverse to said axis of said passageway.

2. The security mounting arrangement of claim 1 wherein said mounting bracket and said shielding bracket abut one another when engaged with one another and close said passageway between said first end and said second end.

3. The security mounting arrangement of claim 2 wherein said passageway is further defined as a through-hole between said first end and said second end when said mounting bracket and said shielding bracket are engaged with one another.

4. The security mounting arrangement of claim 1 wherein said at least one tongue and groove arrangement is further defined as a plurality of tongue and groove arrangements.

5. The security mounting arrangement of claim 4 wherein said plurality of tongue and groove arrangements includes a first tongue and groove arrangement and a second tongue and groove arrangement, said first tongue and groove arrangement and said second tongue and groove arrangement positioned on opposite sides of said axis.

6. The security mounting arrangement of claim 4 wherein said plurality of tongue and groove arrangements includes a first tongue and groove arrangement and a second tongue and groove arrangement, said first tongue and groove arrangement positioned proximate to said first aperture and said second tongue and groove arrangement positioned proximate to said second aperture.

7. The security mounting arrangement of claim 4 wherein said plurality of tongue and groove arrangements includes a first tongue and groove arrangement with a first groove having a first bottom surface in a first plane and a second tongue and groove arrangement with a second groove having a second bottom surface in a second plane, said first plane being transverse to said second plane.

8. The security mounting arrangement of claim 4 wherein said plurality of tongue and groove arrangements includes a first tongue and groove arrangement with a first groove having a first bottom surface in a first plane and a second tongue and groove arrangement with a second groove having a second bottom surface in a second plane, said first plane being parallel to said second plane.

9. The security mounting arrangement of claim 1 further comprising:
a first fastening member having:
a shaft with outwardly-facing threads and extendable through said first aperture; and
a head engaged with said shaft and larger than said first diameter, said head positioned in said third portion.

10. The security mounting arrangement of claim 9 wherein said shaft protrudes out of said first aperture a first length, said head defines a height, said third portion extends along said axis a second length, and said first length combined with said height is greater than said second length.

11. The security mounting arrangement of claim 1 wherein said first aperture is defined in a first plane and said second aperture is defined in a second plane, wherein said first plane and said second plane are transverse to one another.

12. The security mounting arrangement of claim 11 wherein said first plane and said second plane are perpendicular to one another.

13. The security mounting arrangement of claim 1 further comprising:
a first fastening member receivable in said passageway and having:
a shaft with outwardly-facing threads and extendable through said first aperture; and
a head engaged with said shaft and having a width in plane normal said axis of said passageway, said width larger than said first diameter and larger than said second diameter, said head positioned in said third portion.

14. A security mounting arrangement comprising:
a mounting bracket having a first aperture and a second aperture spaced from one another, said first aperture configured to receive a fastener for interconnecting said mounting bracket to an accessory structure, said second aperture configured to receive another fastener for interconnecting said mounting bracket to a primary structure;
a shielding bracket selectively engageable with said mounting bracket having a third aperture aligned with said first aperture when said mounting bracket and said shielding bracket are engaged with one another;
wherein a passageway extending along an axis is defined by said first aperture and said third aperture and extends through said mounting bracket and said shielding bracket when said mounting bracket and said shielding bracket are engaged with one another, said passageway extending between a first end defined by said mounting bracket and a second end defined by said shielding bracket, said passageway having a first portion with a first diameter positioned proximate to said first end of said passageway, said passageway having a second portion with a second diameter positioned proximate to said second end of said passageway, said passageway having a third portion with a third diameter positioned between said first portion and said second portion along said axis, and said third diameter being greater than said first diameter and said second diameter;
a first fastening member being a bolt extendable through said second aperture, said first fastening member having shaft with outwardly-facing threads and a fifth aperture having inwardly-facing threads;
a second fastening member being a nut threadingly engageable with said outwardly-facing threads of said first fastening member;
a sleeve having a sixth aperture configured to receive said second fastening member and an outer arcuate surface, said sixth aperture having a first portion with a first diameter positioned proximate to said second fastening member, a second portion with a second diameter less than said first diameter of the sixth aperture positioned proximate to said first portion, and a third portion with a third diameter greater than said second diameter of the sixth aperture positioned adjacent said second portion; and
a third fastening member being a bolt extendable through said sixth aperture and threadingly engageable with said inwardly-facing threads, said third fastening member having a head with a fourth diameter greater than said second diameter of said sixth aperture and less than a third diameter of said sixth aperture.

15. The security mounting arrangement of claim 14 wherein said second fastening member defines a height and is fully encircled by said sleeve along said height.

16. The security mounting arrangement of claim 14 further comprising: a fourth fastening member being a nut disposed between said head of said third fastening member and said second portion of the sixth aperture.

* * * * *